United States Patent [19]

Meyer

[11] Patent Number: 5,349,761
[45] Date of Patent: Sep. 27, 1994

[54] LINEAR MEASURING DEVICE

[76] Inventor: Hans Meyer, Rue du Bugnon 24, CH1020 Renens, Switzerland

[21] Appl. No.: 6,995

[22] Filed: Jan. 21, 1993

[30] Foreign Application Priority Data

Jan. 27, 1992 [CH] Switzerland ............. 00217/92-2

[51] Int. Cl.⁵ ............................................. G01B 5/02
[52] U.S. Cl. ........................................ 33/810; 33/811; 33/815
[58] Field of Search ............... 33/783, 794, 795, 802, 33/810, 811, 812, 815, 555.1, 501.1

[56] References Cited

U.S. PATENT DOCUMENTS 4,437,055 3/1984 Meyer .
4,873,771 10/1989 Wust .
5,249,366 10/1993 Takahashi et al. ............. 33/811

FOREIGN PATENT DOCUMENTS 3335743 11/1984 Fed. Rep. of Germany .
82270 2/1920 Switzerland ............. 33/810

Primary Examiner—William A. Cuchlinski, Jr.
Assistant Examiner—Alvin Wirthlin
Attorney, Agent, or Firm—Young & Thompson

[57] ABSTRACT

The linear measuring device comprises a rail (1) with a fixed measuring jaw (4) and a slide (5) with a movable measuring jaw (6). A holding member (9) with a handle hole (10) is adjustably mounted on the rail (1). The slide (5) has a ring (20) arranged displaceably therein. This ring is connected with a clamping piece (30) via connecting elements (36, 39). This clamping piece, after attaining a predetermined measuring pressure, is brought into the clamped position on the rail (1) and thus permits the maintenance of a constant measuring pressure, the slide (5) being shiftable, with the clamping piece (30) being locked in place, under the action of the spring (32) with respect to the clamping piece (30) whereby the measuring object can be adjusted into the precise measuring position under spring force. The arrangement of handle hole (10) and ring (20) offers the advantage that maximally precise measurements can be quickly performed in correspondence with a scissor-like operation of the device.

16 Claims, 4 Drawing Sheets

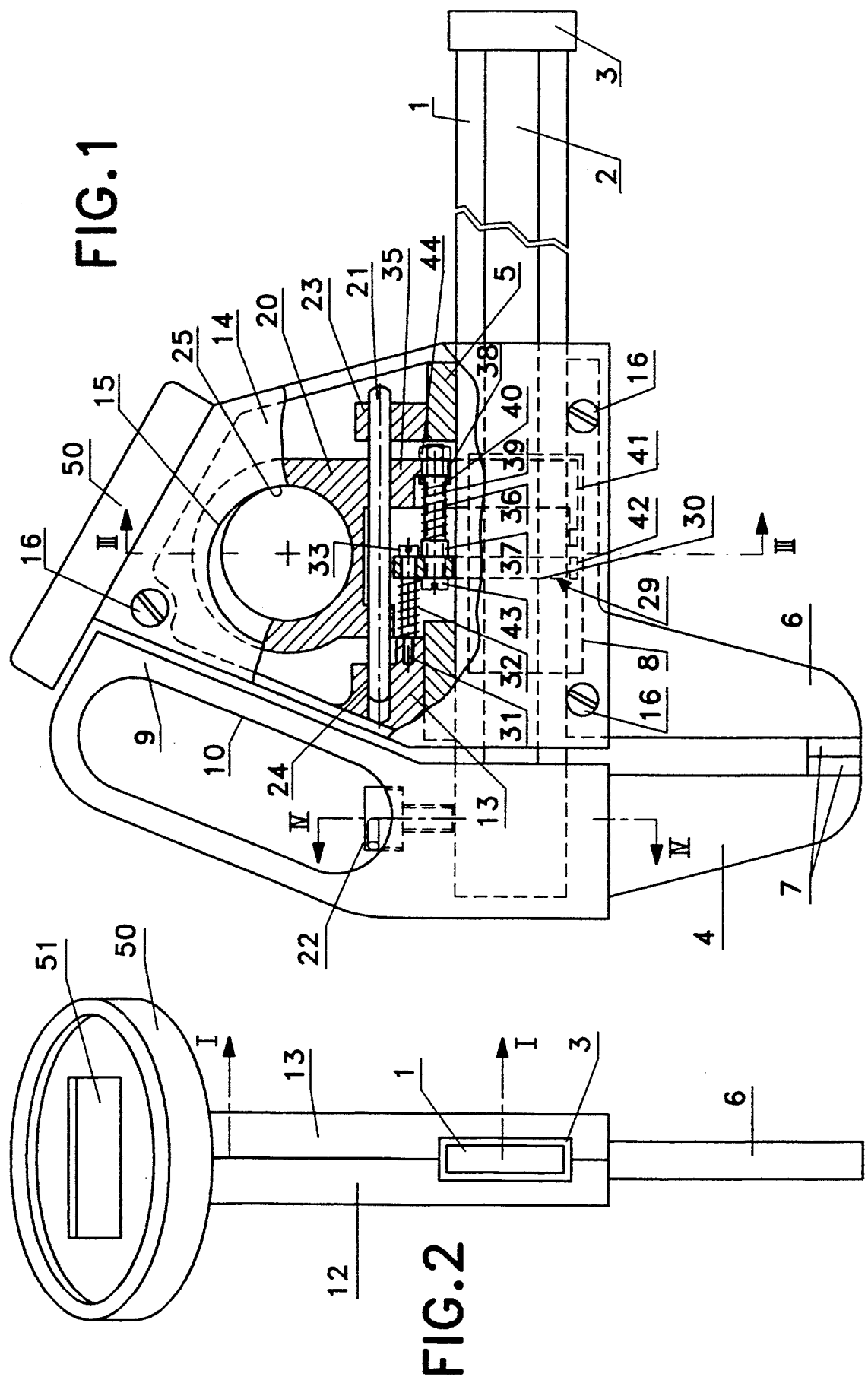

LINEAR MEASURING DEVICE

FIELD OF THE INVENTION

The invention relates to a linear measuring device consisting of a rail on which a slide is adjustably arranged, the rail and the slide being provided with measuring jaws, and the rail including a holding member exhibiting at least one handle hole and the slide being provided with a ring handle, and wherein the slide is equipped with a clamping means acting on the rail, and the ring handle is connected to the clamping means for operation of the latter.

BACKGROUND OF THE INVENTION

Such a device has been described, for example, in DE 33 35 743 A1. This device, however, is not suited for measurements of very high accuracy.

In recent times, measuring devices, especially slide-type gauges, have been developed further so that presently measuring pickups are available having a measurement resolution on the order of magnitude of 1/1000 mm. This means that increased attention must be devoted to the influences exerted by errors occurring during the measurement.

Linear measuring devices, such as slide-type gauges, bend under the influence of the measuring stresses and therefore are very sensitive to variations in measuring pressure. Thus, measuring accuracy is served well by maintaining the measuring pressure as constant as possible and making the measuring step as independent as possible from the sensory ability of the person performing the measuring step. In order to attain this object, solutions have been proposed as disclosed, for example, in DE 33 35 743 A1 or U.S. Pat. No. 4,873,771. Both instances involve instruments for the measurement of distances. The influence by the person doing the measurement is eliminated by the feature that, after a certain measuring pressure has been reached upon engagement of the measuring jaws, the jaws are mutually blocked so that they no longer react to outside influences.

It has been known from the measuring art that a measuring device in most cases will not as yet assume the ideal measuring position upon a first engagement; this depends, inter alia, on the manner in which the device is manipulated. It is then possible, while maintaining the measuring pressure, to bring the device into the definite measuring position by holding it more loosely, by relatively small motions or by vibrations, thus attaining accurate measuring results. However, in the aforementioned devices, such correcting steps cannot be performed since, after all, the measuring arms are blocked upon the first engagement.

It is furthermore known that slide-type gauges are poorly suited for certain, frequently occurring measuring tasks. This holds true in case of workpieces which are being machined or which are clamped in place for checking purposes.

SUMMARY OF THE INVENTION

It is an object of this invention to overcome the above-mentioned drawbacks. The object has been attained by providing that the ring handle is adjustably arranged in a housing, and that the clamping means exhibits a clamping piece supported between the housing and the ring handle and extending at least in part around the rail, this clamping piece upon the advancement of the ring handle and the occurrence of a predetermined measuring force seizing on the rail by assuming an oblique position. By way of a spring determining the measuring force, the clamping piece is connected with the housing in such a way that the slide, with the clamping piece being fixed in place, is arranged to be displaceable with respect to the clamping piece under the effect of the spring in order to adjust itself under spring force to the precise measuring position.

The device according to this invention thereby offers the advantage that one device combines maximum measuring accuracy and simultaneously best measuring comfort.

Advantageously, the annular opening of the ring handle coincides with a finger opening cut out from the housing so that the operating finger simultaneously holds the device.

This permits a very secure and comfortable manipulation and a simple structure of the device.

One embodiment is characterized in that the clamping piece is suspended in a screw inserted in the housing, the spring determining the measuring force urging the clamping piece against the head of the screw. In the measuring position, a play exists between the clamping piece and the head, making it possible for the slide to adjust itself into the precise measuring position under the bias of the spring.

This type of structure is especially simple and permits a ready adjustment of the slide into the precise measuring position.

According to a preferred embodiment, the spring determining the measuring force acts, by way of a pin mounted in the housing, on a part of the clamping piece located on the side of the latter facing away from the ring handle.

This arrangement permits a secure locking of the clamping piece and an optimum force distribution during the operation of the device.

Advantageously, the ring handle herein has an extension acting on the aforementioned end part in a direction in opposition with respect to the pin, in a manner offset toward the ring handle, in such a way that, due to a torque acting on the clamping piece, the clamping piece is locked onto the rail in an oblique position when a predetermined measuring pressure has been reached.

It may furthermore be advantageous to provide the housing with a second stop, the clamping piece in the unlocked condition being resiliently pressed against this stop markedly perpendicularly to the rail. Such an arrangement permits an easy displacement of the slide in the unlocked condition.

Finally, it may be advantageous to locate the holding member exhibiting the handle hole to be adjustable on the rail or on a guide strip mounted in parallel to the rail. Such an arrangement provides for convenient measuring of relatively large and relatively small measuring objects with the same device.

BRIEF DESCRIPTION OF DRAWINGS

Additional details, features and advantages can be derived from the dependent claims and the following description of an embodiment and two variations thereof, illustrated in the appended drawings wherein:

FIG. 1 is a lateral view of the linear measuring device with a partial section along plane I—I in FIG. 2, FIG. 2 is an end view.

DETAILED DESCRIPTION OF THE PREFERRED EMBODIMENTS

Figure 5:
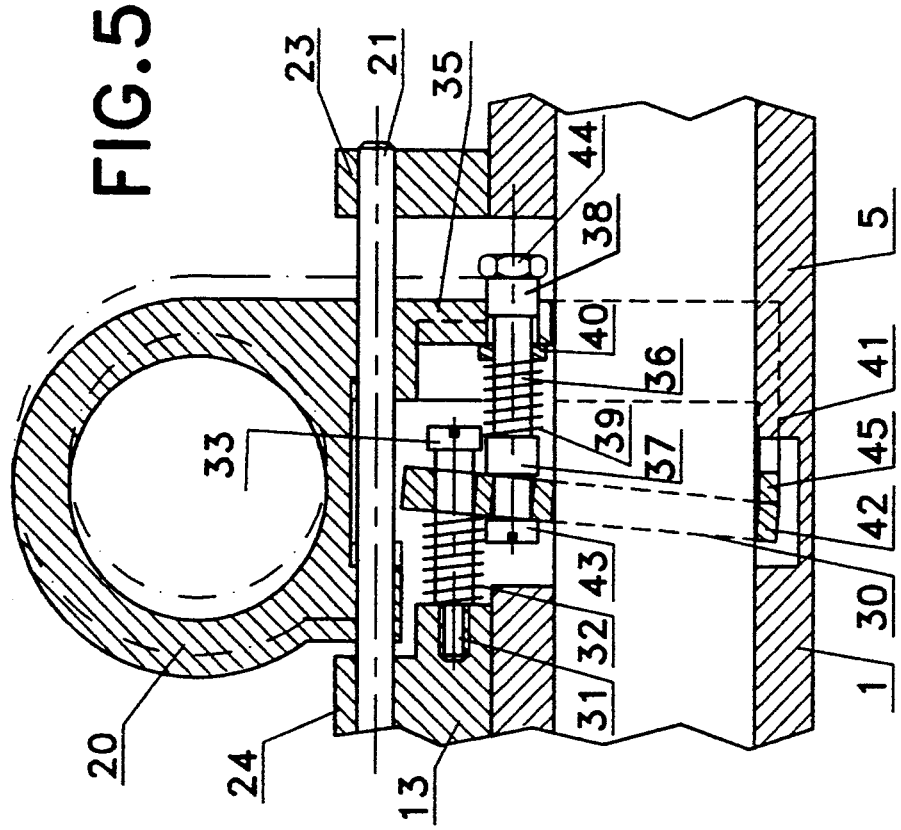
FIG. 5 shows a partial longitudinal sectional view of the device illustrated in FIG. 1 in the measuring position.

The linear measuring device according to FIGS. 1-5 consists of a rail 1 on which a fixed measuring jaw 4 is attached in a conventional way at an end of rail 1 opposite a free end 3 of rail 1, while the movable measuring jaw 6 is located on a slide 5. The measuring jaws 4 and 6 are equipped with measuring contacts 7. A scale 2 is provided on the rail 1 which is read by means of a reading unit 8 (FIG. 3) of a conventional type of structure as disclosed, for example, in EP 0053091. A holding member 9 with a handle hole 10 is mounted on the rail 1 by means of a screw 22 at the location of the fixed measuring jaw 4.

Figure 4:
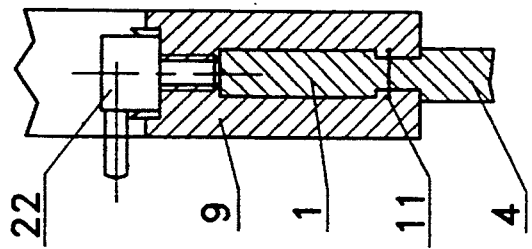
FIG. 4 is a partial cross-sectional view along line IV—IV in FIG. 1.
Figure 3:
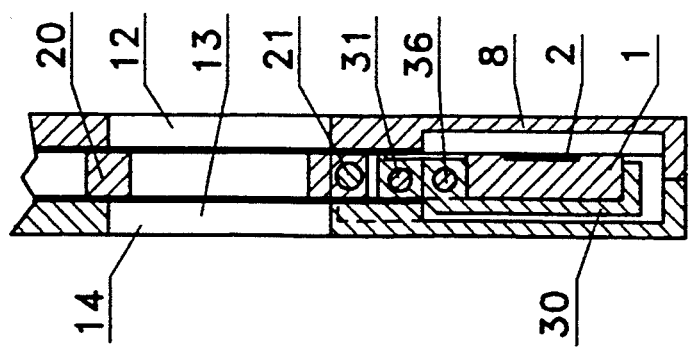
FIG. 3 is a partial cross-sectional view along line III—III in FIG. 1.

The holding member 9 engages, as shown in FIG. 4, with two arms 11 around the rail 1 with the result that the member can be displaced at will on this rail and can be retained by means of the screw 22. Thereby the measuring range of the gauge, restricted by the open position of one's hand, can be broadened as desired by shifting the holding member 9. A housing 14 consisting of two halves 12 and 13 and provided with openings 15 is attached to the slide 1 by means of three screws 16. A ring handle, designed as a ring 20, is located in the interior of the housing 14 made up of the halves 12 and 13, an axle 21 being received in this ring and being movable in bearings 23 and 24 in the longitudinal sense. The openings 10 and 25 provided in the holding member 9 and the ring 20 serve for the introduction of the fingers either of the right or the left hand, and permit the forward and backward setting of the slide 5 in the manner of scissors. The annular opening 25 of the ring 20 coincides with the openings 15 of the housing so that the operating finger simultaneously holds the device.

This device comprises a clamping means 29 with a clamping piece 30 extending in a U shape around the rail 1 (FIG. 3) and suspended on a screw 31 mounted in the housing section 13. A spring 32 urges the clamping piece 30 against the head 33 of the screw 31. The ring 20 exhibits an arm 35 wherein a pin 36 is received, the latter extending through the clamping piece 30 and being retained on both sides by a head 43 and a nut 44. Between sleeves 37 and 38, a spring 39 is arranged on this pin and is supported via a ring 40 on the arm 35 of the ring 20. The arm 35 has an extension 41 which extends around the rail 1 and exhibits a finger 45 located in opposition to the head 42 of the clamping piece 30.

An indicating device 50 with a display window 51 is rotatably attached to the housing 14. By way of electrical connections, the result of the reading unit 8 is transmitted to the indicating device 50. Rotation of the indicating device 50 and the display window 51 makes it possible to place the information into a favorable read-off position.

If the dimension of an object is to be determined, the linear measuring device is opened by retracting the slide 5. During this step, one or several fingers of one hand enter the handle hole 10, while the thumb is introduced into the ring 20. By opening one's hand, the slide 5 is moved backwards on the rail 1. Closing of the slide 5 takes place by exerting pressure on the ring 20 (toward the left in FIG. 1) and thus, via the springs 32 and 39, on the slide 5. These springs are dimensioned herein so that their spring bias is higher than the sliding resistance of the slide 5 on the rail 1 and thus there is no relative movement of the ring 20 with respect to the slide 5 during the advancement. However, as soon as the measuring object comes in touch with the contacts 7, the springs 32 and 39 are compressed during further adjustment of the ring 20 (FIG. 5). As soon as a spring tension has been reached corresponding to the desired measuring pressure, the arm 35 with extension 41 is pressed against the head 42 of the clamping piece 30. The latter is thereby clamped fixedly on the rail 1 with an oblique positioning and thus prevents further movement of the ring 20. The slide 5, supported on the clamping piece 30 by way of the spring 32, can yield to the measuring pressure and thus can adapt itself to the measuring object.

Upon release of the ring 20, the latter is returned, under the effect of the spring 39, into the position indicated in dot-dash lines in FIG. 5. The clamping piece 30, however, remains fixedly clamped on the rail 1 under the action of the pressure exerted by the spring 32. Only by means of a further movement of the ring 20 toward the right in FIG. 5 can the clamping piece be released by means of the pin 36, and the slide 5 can again travel along the rail 1.

Figure 7:
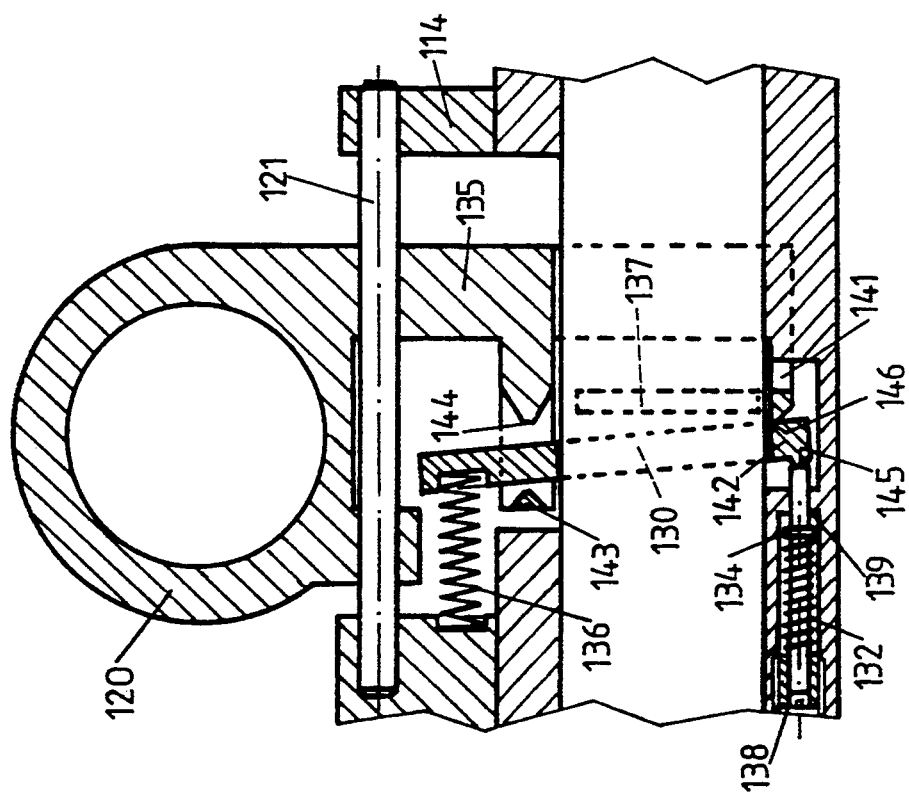
FIG. 7 is a partial longitudinal sectional view of the modification while entering the measuring position.
Figure 6:
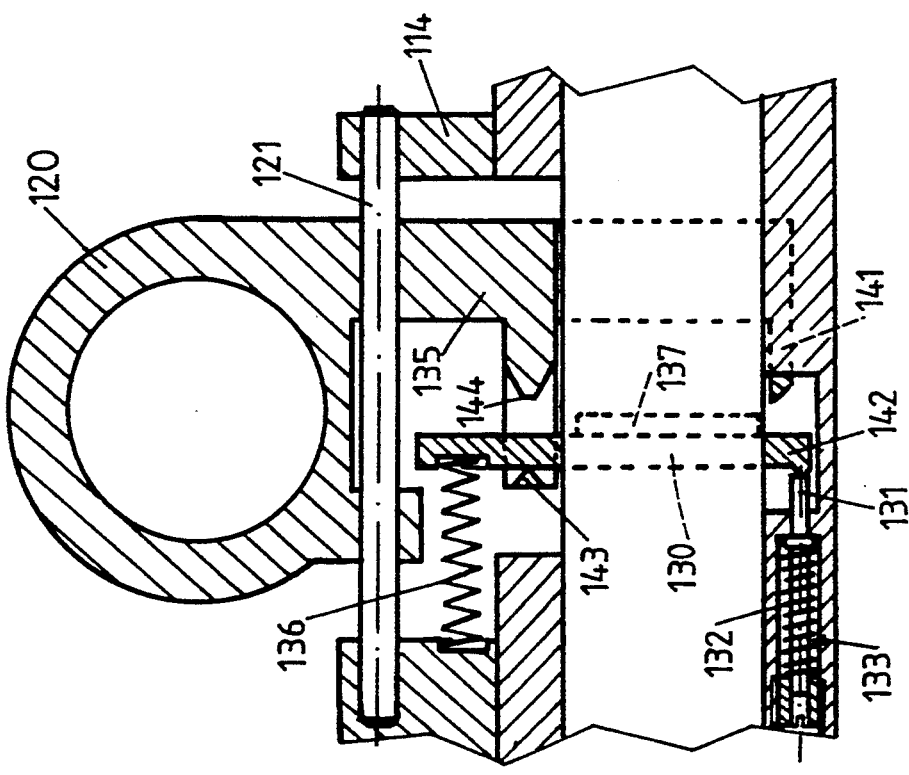
FIG. 6 is a partial longitudinal sectional view of a modification in the rest position.

The version illustrated in FIGS. 6 and 7 differs from the above-described embodiment by a differently fashioned operation of the clamping piece.

This clamping piece 130 likewise extends around the measuring rail in a U shape and is operated by the ring handle 120. The latter is displaceably mounted in the longitudinal direction on an axle 121 in the housing 114 and has an arm 135 with an extension 141 cooperating with the lower part 142 of the clamping piece 130.

The ring handle 120 furthermore comprises two stops 143 and 144 acting on the top part of the clamping piece 130. A pin 131 is resiliently mounted in a recess 133 of the housing 114, a spring 132 being supported, on the one hand, on a ring 134 of the pin 131 and on a setscrew 138. The spring 132 is thus received in the recess 133 under a bias wherein the bias can be altered by rotating the setscrew 138. The pin 131 cooperates with the lowermost end of the clamping piece 130. The device comprises furthermore a spring 136 clamped in place between the upper end of the clamping piece 130 and the housing 114. In order to secure the position of this spring 136, a pin can be provided therein; this pin is not illustrated. It is to be noted that the force of the spring 136 is very much smaller than that of the spring 132 determining the measuring force. The housing 114 is provided with a stop 137 against which the clamping piece 130 is pressed by means of the springs 136 and 132 in the freely movable position of the slide 5 (FIG. 6). In this position, the slide 5 can glide along freely since the clamping piece 130 is oriented perpendicularly to the rail 1. However, as soon as the measuring object comes in touch with the contacts 7, the springs 132 and 136 are compressed upon further adjustment of the ring handle 120, the extension 141 and the stop 144 coming into contact with the clamping piece 130. It can be seen that the pin 131 comes into contact with the aforementioned lower part 142 at a substantially lower point 145 than the point 146 where contact is established with the extension 141. From this results a torque placing the clamping piece 130 into the oblique position upon reaching a predetermined measuring pressure, thereby fixedly clamping the piece onto the rail 1. Upon release of the ring handle 120, this clamping piece 130 remains, under the force of the spring 132, in the locked position (FIG. 7) wherein there is an interspace between the ring 134 and the rear wall 139 of the recess 133. This interspace makes it possible for the slide 5 to be displaceably arranged, with the clamping piece 130 being locked in place, in order to be able to adjust itself into the precise measuring position under the bias of the spring 132. In this connection, it is to be noted that the bias of the spring 136 is dimensioned to be very weak so that the clamping piece 130 remains in the locked position.

For unlocking the clamping piece 130, the ring handle 120 is shifted toward the right in FIG. 7 so that this handle, by means of the stop 143, brings the clamping piece 130 into a position perpendicular to the rail 1 and presses the clamping piece against the stop 137 of the housing 114. In this position (FIG. 6), the clamping piece 130 is secured in the displaceable position by the bias of the springs 136 and 132, and the slide can be shifted via the ring handle 120 as well as the housing. The aforedescribed arrangement provides a very precise locking and unlocking of the clamping piece, as well as a secure displacement with the clamping piece being unlocked.

Figure 8:
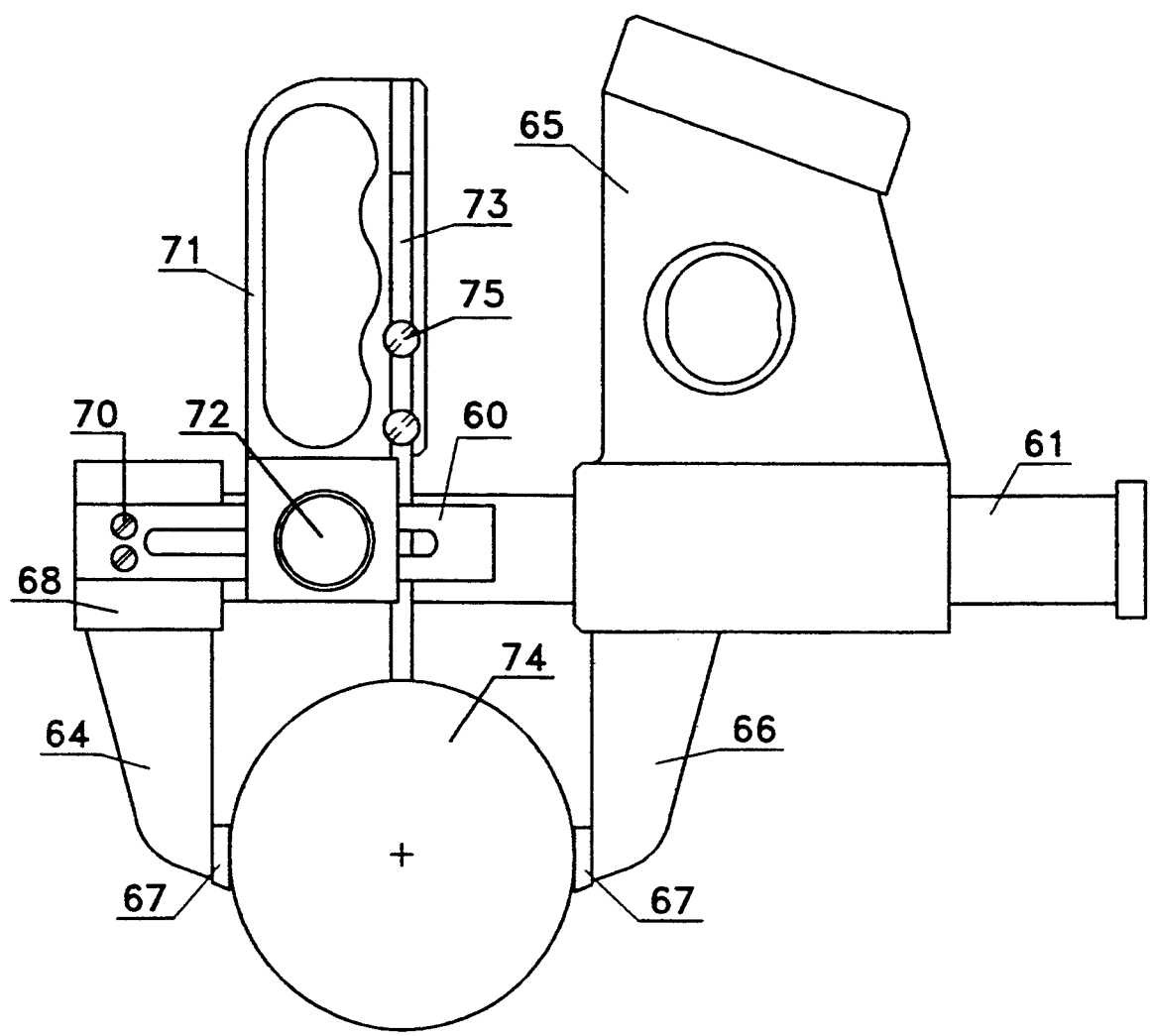
FIG. 8 is a lateral view of a second modification.

A second version is shown in FIG. 8 and comprises likewise a rail 61, a fixed measuring jaw 64, a slide 65 with a movable measuring jaw 66, and measuring contacts 67. A guide strip 60 extending in parallel to the rail is attached by means of screws 70 to a head 68 of the rail 61. The handle 71, which can be clamped in place by a screw 72, is displaceably arranged on this guide strip. A depth stop 73 is countersunk in sliding fashion into the handle 71; by means of this stop 73, the device is supported on the measuring object 74. By means of screw elements 75, the depth stop 73 is retained on the handle 71 in a suitable position. For checking the zero position, the handle 71 can be moved back into the initial position. In this position, the depth stop 73 does not interfere with the slide 65 so that the measuring contacts 67 mounted to the legs 64 and 66 can be placed into mutual contact without having to reset the depth stop 73. It is also possible to arrange the depth stop 73 on the rail 61 or on the guide strip 60 to be adjustable in the vertical and horizontal directions. The clamping device with ring handle can be designed, if desired, in accordance with FIG. 5 or 6.

The invention, of course, is not limited to only the illustrated embodiments; rather, the latter can undergo additional alterations within the idea of this invention as defined in the claims. The ring 20 can be arranged in the housing 41 to be pivotable instead of displaceable. The connecting elements between ring 20 and slide 5 can comprise a single spring. Furthermore, the handle hole 10 of the holding member arranged on the rail could be designed for introduction of one's thumb, and the ring handle located on the slide could be designed for operation by the other fingers. The device could also be equipped for external and internal measurements by locating respectively one extension 41 on two sides of the ring 20.

I claim:

1. Linear measuring device comprising a rail (1) on which a slide (5) is adjustably arranged, a measuring jaw (4) on the rail (1) and a measuring jaw (6) on the slide (5), and the rail (1) including a holding member (9) having at least one handle hole (10) and the slide (5) being provided with a ring handle (20; 120), and wherein the slide (5) is equipped with a clamping means (29) acting on the rail (1), and the ring handle (20; 120) is connected with the clamping means (29) for operation of the latter, the ring handle (20; 120) being adjustably arranged in a housing (14; 114), the clamping means (29) having a clamping piece (30; 130) supported between the housing (14; 114) and the ring handle (20; 120) and extending at least in part around the rail (1), the clamping piece (30; 130) being swingable relative to the ring handle (20; 120) and relative to the housing (14; 114) and relative to the slide (5) and relative to the rail (1) between a first position in which the clamping piece (30; 130) slides freely along the rail (1) and a second position in which the clamping piece (30; 130) grips the rail (1) to prevent sliding movement of the clamping piece (30; 130) on the rail (1), spring means (32; 132, 39) maintaining said clamping piece (30; 130) in said first position when the slide (5) and the ring handle (20; 120) move together as a unit toward the holding member (9), the ring handle (20; 120) being movable toward the holding member (9) relative to the slide (5) when movement of the slide (5) toward the holding member (9) is prevented by an object disposed between said measuring jaws (4, 6), and means carried by said ring handle (20; 120) to move said clamping piece (30; 130) to said second position upon said movement of said ring handle (20; 120) relative to the slide (5).

2. Linear measuring device according to claim 1, characterized in that an opening of the ring handle (20; 120) coincides with a finger opening cut out in the housing (14; 114).

3. Linear measuring device according to claim 1, characterized in that the ring handle (20) has an axle (21) received to be movable in bearings (23, 24) of the housing (14).

4. Linear measuring device according to claim 1, characterized in that the spring pressure of the spring (32; 132) is higher than the sliding resistance of the slide (5) on the rail (1) so that the clamping means (29) is actuated only upon the occurrence of a predetermined measuring force on the measuring jaw (6) of the slide (5).

5. Linear measuring device according to claim 1, characterized in that the ring handle (20; 120) is provided with an arm (41; 141) acting on the clamping piece (30; 130) in such a way that said arm (41; 141) presses, after a predetermined advancement of the ring handle (20; 120) with respect to the housing (14; 114), the arm (41; 141) onto the clamping piece (30; 130) and fixedly clamps the latter in an oblique position onto the rail (1).

6. Linear measuring device according to claim 1, characterized in that the clamping piece (30) is suspended by a screw (31) inserted in the housing (14), wherein the spring (32) determining the measuring force urges the clamping piece (30) against the head (33) of the screw (31), and wherein, in the measuring position, a play exists between the clamping piece (30) and the head (33) permitting the slide to adjust itself into the precise measuring position under the pressure of the spring (32).

7. Linear measuring device according to claim 1, characterized in that it comprises a second spring (39) arranged between the ring handle (20) and the clamping piece (30), the spring pressure of this second spring being higher than the sliding resistance of the slide (5) on the rail (1).

8. Linear measuring device according to claim 1, characterized in that the spring (132) determining the measuring force acts, via a pin (131) supported in the housing(114), on a part (142) of the clamping piece (130) located on the side of the clamping piece (130) facing away from the ring handle (120).

9. Linear measuring device according to claim 8, characterized in that the ring handle (120) has an extension (141) acting on said part (142) of the clamping piece (30) in a direction in opposition to the pin (131) and in a manner offset with respect to the ring handle, in such a way that, due to a torque acting on the clamping piece (130), the clamping piece (130), upon attainment of a predetermined measuring pressure, is locked onto the rail (1) in an oblique position.

10. Linear measuring device according to claim 9, characterized in that the ring handle (120) has a first stop (143) arranged in such a way that it unlocks the clamping piece (130) upon return of the ring handle (120) and guides this clamping piece into a markedly perpendicular position with respect to the rail (1).

11. Linear measuring device according to claim 10, characterized in that the housing is provided with a second stop (137) against which the clamping piece (130), in the unlocked condition, is resiliently pressed markedly perpendicularly to the rail (1).

12. Linear measurement device according to claim 11, which further comprises a second spring (136) of a spring force lower than the spring (132) determining the measuring force, this second spring (136) being arranged between the housing (114) and the clamping piece (130) in such a way that it urges the clamping piece (130), in the unlocked condition, against the second stop (137).

13. Linear measuring device according to claim 1, characterized in that the holding member (9; 71) exhibiting the handle hole (10) is adjustably arranged on the rail (1) or on a guide strip (60) mounted in parallel to the rail (1).

14. Linear measuring device according to claim 13, which further comprises a depth stop (65) adjustably mounted on the holding member (9; 71), on the rail (1), or on the guide strip (60), the device being supportable on a measuring object (74) by means of this step.

15. Linear measuring device according to claim 1, characterized in that the slide (5) comprises indicating means (50, 51) for indicating the measurement result.

16. Linear measuring device according to claim 1, characterized in that the ring handle (120) is displaceably supported on an axle (121) of the housing (114).

* * * * *